United States Patent [19]

Merten et al.

[11] Patent Number: 5,033,315
[45] Date of Patent: Jul. 23, 1991

[54] APPARATUS FOR DETERMINING THE TENSION IN A CHAIN OR THE LIKE

[75] Inventors: Gerhard Merten; Wilfried Mertens, both of Lunen; Werner Bohle, Ludinghausen, all of Fed. Rep. of Germany

[73] Assignee: Gewerkschaft Eisenhutte Westfalia GmbH, Fed. Rep. of Germany

[21] Appl. No.: 493,487

[22] Filed: Mar. 12, 1990

[30] Foreign Application Priority Data

Mar. 15, 1989 [DE] Fed. Rep. of Germany ....... 3908370

[51] Int. Cl.⁵ ............................................... G01L 5/10
[52] U.S. Cl. ............................. 73/862.39; 73/862.48
[58] Field of Search .......... 73/862.39, 862.44, 862.45, 73/862.47, 862.48, 862.54, 862.65, 862.31, 829

[56] References Cited

U.S. PATENT DOCUMENTS

| | | | |
|---|---|---|---|
| 3,093,578 | 6/1963 | Hofmeister | 73/862.54 |
| 3,289,473 | 12/1966 | Louda | 73/862.44 |
| 3,832,897 | 9/1974 | Schenck | 73/862.31 |
| 4,112,751 | 9/1978 | Grunbaum | 73/862.48 X |
| 4,624,145 | 11/1986 | Weber et al. | 73/862.31 |

*Primary Examiner*—Charles A. Ruehl
*Attorney, Agent, or Firm*—Samuels, Gauthier & Stevens

[57] ABSTRACT

Apparatus for determining the tension in a chain, for example, has a pair of bearings in a housing mounting a shaft for rotation. The shaft bears a chain wheel. The bearing nearest the chain wheel is fixed in the housing while the opposite bearing is fitted into a floating ring which bears on the ends of a pair of bolts incorporating strain gauges.

6 Claims, 2 Drawing Sheets

APPARATUS FOR DETERMINING THE TENSION IN A CHAIN OR THE LIKE

FIELD OF THE INVENTION

The present invention relates to apparatus usable to determine the tension in a traction member and, particularly, the tension in a chain used to drive the machinery, such as in mineral mining.

BACKGROUND TO THE INVENTION

In the mineral mining, it is well known to use chains to drive machinery. For example, it is well known to use a chain to drive a plough back and forth alongside a mineral, e.g. coal face. In such drive systems it is also known to measure load forces with strain gauges and to disconnect the drive in the event of overload. The strain gauges can be incorporated into pins or rods fitting into gearing (see DE-OS 3,323,251 and DE-OS 3,323,250).

With chain drives it is often necessary to subject the chain to a specific preliminary tension. If the tension is too low, slackness can occur which can cause interruption in operation if the chain springs off its chain wheel or whipping which is dangerous to personnel. Conversely, if the tension is set too high then the chain, the bearings and associated components will be subjected to premature wear. It is thus known to incorporate chain tension adjustement mechanisms, such as hydraulic piston and cylinder units, to displace one or both chain wheels around which the chain is entrained. Hitherto there has been no accurate means for determining the tension in the chain and there is a need for such means.

BRIEF SUMMARY OF THE INVENTION

The invention provides apparatus for determining the tension in a traction member, such as a chain, which enables tensioning forces to be determined accurately at all times to permit pre-tensioning to be achieved more efficiently and for such forces to be controlled more effectively.

Apparatus for performing the invention comprises a shaft supported by one bearing which is fixed and one bearing which is movable as a whole. The movable bearing is then supported by means including a force or displacement measuring device while the associated traction member or chain is driven by or entrained around a chain wheel or the like carried by the shaft.

Apparatus constructed in accordance with the invention may comprise a housing, a shaft, first and second bearings rotatably supporting the shaft in the housing, a wheel member carried by the shaft and around which the traction member is entrained, the first bearing being fixed relative to the housing and means supporting the second bearing for movement relative to the housing in a direction transversally of the shaft; wherein the supporting means includes at least one force measuring device for providing a signal dependent on the tension in the traction member.

The housing can be a supplementary unit flanged or bolted onto existing structure, such as a frame, mounting the chain wheel. The housing can thus, for example, be mounted on a lateral face of the machine frame of a scraper-chain conveyor along which a plough driven by the chain is guided.

The movable bearing can be supported by a ring radially displaceable in the housing. There is then adequate clearance between the support means or ring and the housing so that any moment on the shaft created by tension in the chain exerts force on the measuring device. Preference is given to a construction in which the support means or ring has symmetrically located support faces bearing on the ends of elongate components, such as bolts, pins or rods incorporating strain gauges as measuring devices.

The elongate bolts can extend through bores in the housing into recesses in the ring and screw-threaded engagement can be established between the bolts and the housing bores. The bolts may have heads accessible exteriorly of the housing on which electric plug-and-socket fittings or connectors are provided to enable further equipment to be connected up to receive or generate electrical signals dependent on the force sensed by the gauges.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawing, wherein.

DESCRIPTION OF PREFERRED EMBODIMENT

Figure 1:
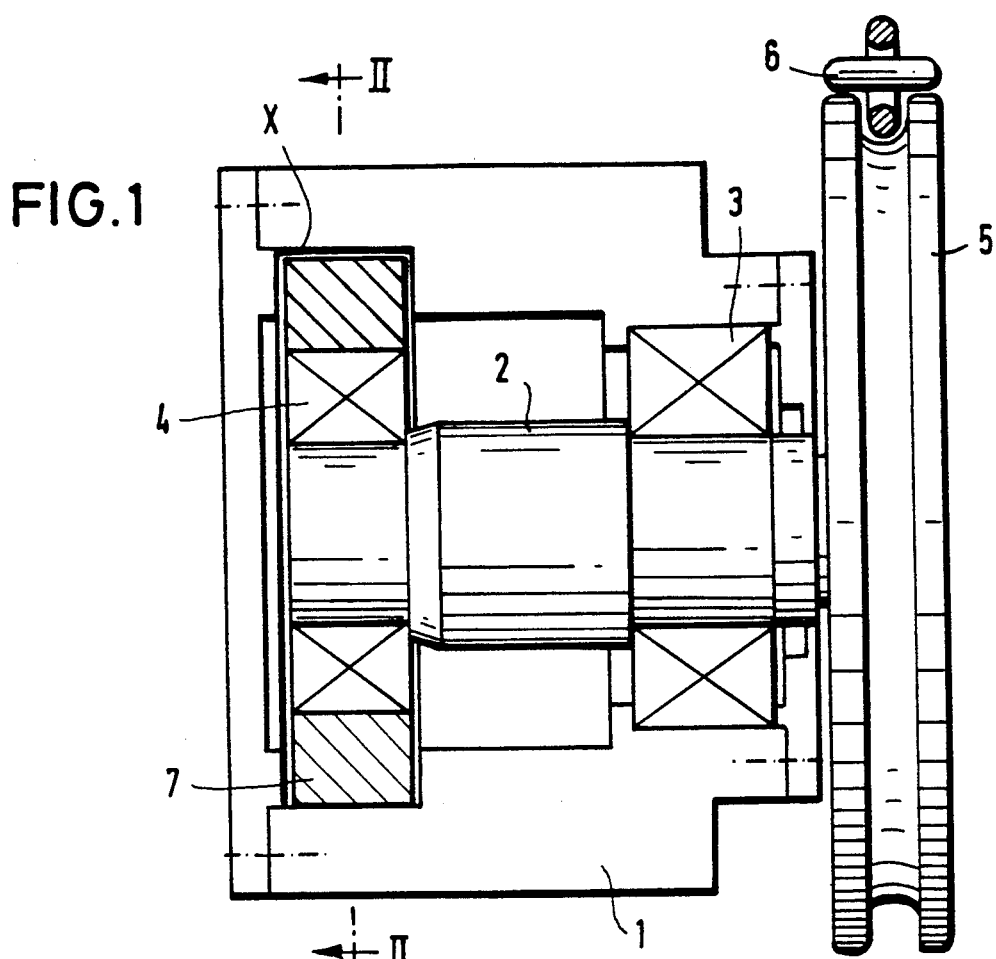
FIG. 1 is a schematic sectional side view of apparatus constructed in accordance with the invention.
Figure 2:
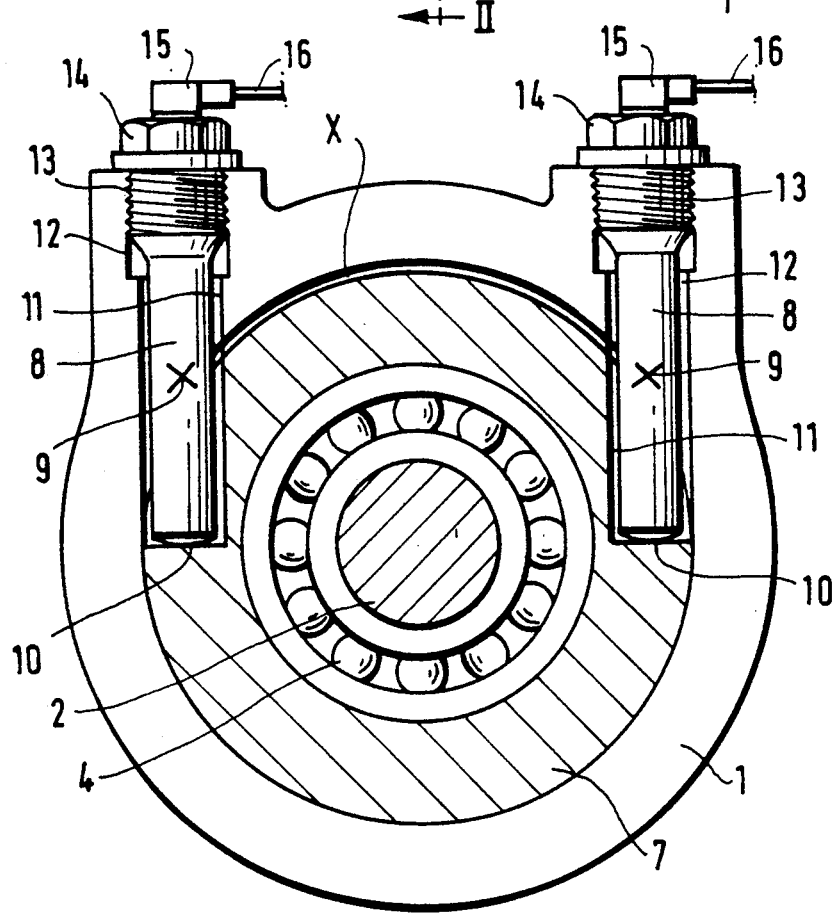
FIG. 2 is a schematic sectional end view of the apparatus taken along the line II—II of FIG. 1.
Figure 3:
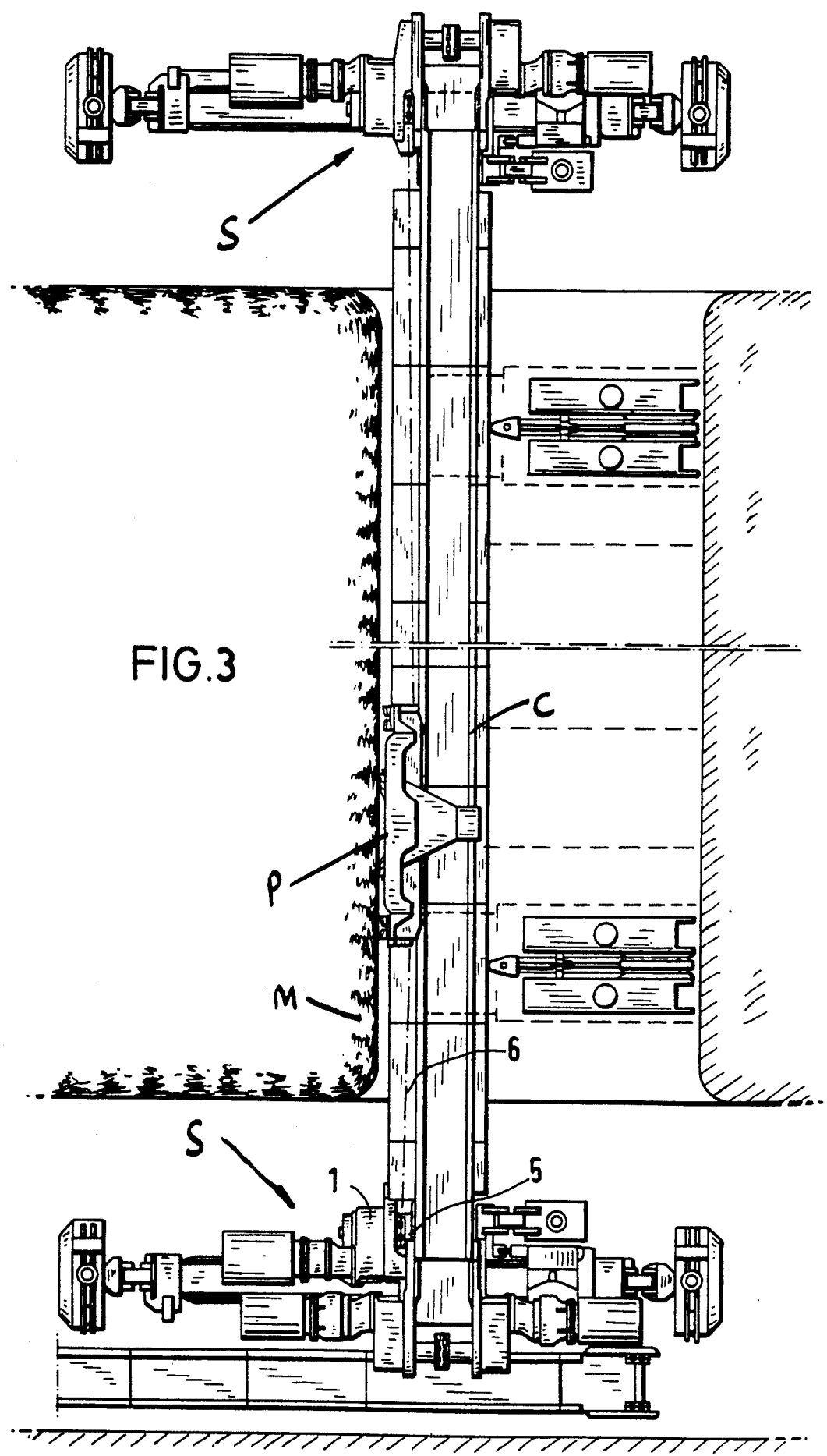
FIG. 3 is a plan view of a mineral mining installation employing the apparatus shown in FIGS. 1 and 2.

As shown in FIGS. 1 and 2 of drawings, apparatus constructed in accordance with the invention has a pair of rolling-element bearings 3, 4 rotatably supporting a shaft 2 in a housing 1. The shaft 2 carries a chain wheel 5 and an endless chain 6 is entrained around the chain wheel 5. FIG. 3 depicts a typical mineral mining installation employing the apparatus. As shown in FIG. 3, a scraper chain conveyor C is disposed alongside a numeral face M. A plough P is moved back and forth alongside the face M by means of the chain 6 to strip mineral from the face M. At the ends of the conveyor C there are roadways in which are disposed drive/reversing stations S with motors on machine frames. The chain 6 is entrained around chain wheels 5 at both stations S.

One of these wheels 5 is driven with drive means. The other chain wheel, which is not driven, can then be the wheel 5 on the shaft 2 of the apparatus as illustrated. However, it is also possible to have the wheel 5 of the apparatus driven instead of freely rotatable. The housing 1 with the shaft 2 can be constructed for a flanged connection to the existing machinery and in the context of the plough drive the housing 1 can be mounted onto the frame of a scraper-chain conveyor.

Returning now to FIGS. 1 and 2, the bearing 3 adjacent the wheel 5 is fixed in the housing 1 while the other bearing 4 is displaceable to a limited extent transversely of the shaft 2. The displaceable bearing 4 is held within a ring 7 substantially without play while the ring 7 is itself located for movement to a limited radial extent as indicated by 'x' in FIG. 1.

A pair of bolts, rods or pins 8 incorporate force measuring means such as resistance type strain gauges 9. These bolts 8 are disposed symmetrically on either side of a vertical central plane extending through the longitudinal axis of the shaft 2. The ring 7 is provided with secant-shaped recesses 11 receiving the bolts. The recesses 11 have planar support faces 10 extending radially of the shaft 2 and the bolts 8 have end surfaces which engage on the faces 10. The housing 1 has bores 12 which form continuations of the recesses 11 and lead to the exterior. The bolts 8 have screw-threaded regions 13 adjacent hexagonal heads 14 which engage with screw-threaded regions of the bores 12 thus permitting the bolts 8 to be fitted and removed. Washers can be interposed between the heads 14 and external support faces of the housing 1. Electric cables connected to the gauges 9 pass through grooves or ducts in the bolts 8 and terminate at the heads 14 with plug-and-socket connectors 15. Further cables 16 link the connectors 15 to associated equipment such as a display or an evaluator for processing of signals derived from the gauges 9.

The dynamic tension in the chain 6 varies according to the prevailing work conditions and this tension exerts a moment on the shaft 2. As the shaft 2 tends to deflect or tilt the pressure exerted by the ring 7 on the bolts 8 varies. The signals provided by the gauges 9 then signify the tension in the chain 6. These signals can be used to adjust the initial tension in the chain 6.

We claim:

1. Apparatus for determining the tension in a traction member, such as a chain, said apparatus comprising: a housing; a shaft; first and second bearings rotatably supporting the shaft in the housing; a wheel member carried by the shaft and around which the traction member is entrained, the first bearing being adjacent the wheel member and fixed relative to the housing; and means for supporting the second bearing for movement relative to the housing in a direction transversally of the shaft, said supporting means including a ring located in the housing for radial displacement and force measuring devices for providing a signal dependent on the tension in the traction member, said ring having a pair of symmetrical radial support faces engaging on elongate members, each elongate member incorporating one of said force measuring devices.

2. Apparatus according to claim 1, wherein the measuring devices are strain gauges.

3. Apparatus according to claim 1, wherein the measuring devices are resistance type strain gauges.

4. Apparatus according to claim 1, wherein the ring has recesses accommodating the elongate members and the housing has bores forming continuations of the recesses through which the elongate members can be fitted and removed.

5. Apparatus according to claim 4, wherein the bores have screw-threaded regions engaging with screw-threaded regions of the elongate members.

6. Apparatus according to claim 4, wherein the elongate members have heads exterior to the housing and electric plug-and-socket connectors on the heads enable connection with the measuring devices.

* * * * *